United States Patent
Schwark et al.

(10) Patent No.: US 8,250,861 B2
(45) Date of Patent: Aug. 28, 2012

(54) ENERGY STORAGE SYSTEM INCLUDING PRESSURIZED RESERVOIR

(75) Inventors: Paul W. Schwark, Royal Oak, MI (US); Andrew J. Nersesian, Livonia, MI (US); Markus E. Schneider, Bautzen (DE)

(73) Assignee: Robert Bosch GmbH, Stuttgart (DE)

( * ) Notice: Subject to any disclaimer, the term of this patent is extended or adjusted under 35 U.S.C. 154(b) by 539 days.

(21) Appl. No.: 12/622,880

(22) Filed: Nov. 20, 2009

(65) Prior Publication Data

US 2011/0120107 A1    May 26, 2011

(51) Int. Cl.
  *F16D 31/02*  (2006.01)
(52) U.S. Cl. .......................................... 60/414; 60/418
(58) Field of Classification Search ..................... 60/328, 60/413, 414, 415, 418, 455
  See application file for complete search history.

(56) References Cited

U.S. PATENT DOCUMENTS

| | | |
|---|---|---|
| 3,846,983 A | 11/1974 | Freedy et al. |
| 4,089,621 A | 5/1978 | Brown |
| 4,162,615 A | 7/1979 | Grattapaglia et al. |
| 4,441,573 A | 4/1984 | Carman et al. |
| 4,566,565 A | 1/1986 | Wicke |
| 4,723,577 A | 2/1988 | Wusterbarth |
| 4,745,745 A * | 5/1988 | Hagin ............................... 60/414 |
| 4,760,697 A | 8/1988 | Heggie et al. |
| 4,784,354 A | 11/1988 | Tavano |
| 4,852,765 A | 8/1989 | Lyzohub |
| 6,313,394 B1 | 11/2001 | Shugar et al. |
| 6,604,795 B2 | 8/2003 | Isono et al. |
| 6,834,737 B2 | 12/2004 | Bloxham |
| 7,107,767 B2 * | 9/2006 | Frazer et al. ..................... 60/414 |
| 7,121,304 B2 | 10/2006 | Gray, Jr. |
| 7,150,508 B2 | 12/2006 | Ganzel |
| 7,232,192 B2 | 6/2007 | Teslak et al. |
| 7,273,122 B2 | 9/2007 | Rose |
| 7,913,791 B2 * | 3/2011 | Rose et al. ..................... 180/165 |
| 8,166,753 B2 * | 5/2012 | Rose ............................... 60/418 |
| 8,186,155 B2 * | 5/2012 | Rose et al. ..................... 60/414 |
| 2008/0136186 A1 | 6/2008 | Gogoana et al. |

FOREIGN PATENT DOCUMENTS

| | | |
|---|---|---|
| EP | 1589264 | 10/2005 |
| GB | 2415757 | 1/2006 |
| WO | WO2008/012558 | 1/2008 |

OTHER PUBLICATIONS

International Search Report and the Written Opinion of the International Searching Authority dated Feb. 17, 2011, 13 pages.

* cited by examiner

*Primary Examiner* — Michael Leslie
(74) *Attorney, Agent, or Firm* — Michael Best & Friedrich LLP

(57) ABSTRACT

An energy storage system includes a reservoir defining an interior chamber, a collapsible bladder positioned within the interior chamber and having working fluid therein, a one-way valve in fluid communication with the interior chamber and operable to permit entry of replacement air into the interior chamber as working fluid exits the bladder, a reversible pump/motor in fluid communication with the bladder, and an accumulator containing working fluid and gas. The accumulator is in selective fluid communication with the reversible pump/motor to deliver pressurized working fluid to the reversible pump/motor when operating as a motor, and to receive pressurized working fluid discharged by the reversible pump/motor when operating as a pump.

20 Claims, 2 Drawing Sheets

ENERGY STORAGE SYSTEM INCLUDING PRESSURIZED RESERVOIR

FIELD OF THE INVENTION

The present invention relates to hybrid drive systems for vehicles and more particularly to hybrid hydraulic drive systems for vehicles.

BACKGROUND OF THE INVENTION

A typical vehicle hybrid hydraulic drive system uses a reversible pump/motor to absorb power from and add power to or assist a conventional vehicle drive system. The system absorbs power by pumping hydraulic fluid from a low pressure reservoir into a hydraulic energy storage system. This hydraulic energy storage system typically includes one or more nitrogen-charged hydraulic accumulators. Hybrid hydraulic drive systems typically add power to conventional vehicle drive systems by utilizing the hydraulic energy stored in the hydraulic accumulators to drive the reversible pump/motor as a motor.

SUMMARY OF THE INVENTION

The present invention provides, in one aspect, an energy storage system including a reservoir defining an interior chamber, a collapsible bladder positioned within the interior chamber and having working fluid therein, a one-way valve in fluid communication with the interior chamber and operable to permit entry of replacement air into the interior chamber as working fluid exits the bladder, a reversible pump/motor in fluid communication with the bladder, and an accumulator containing working fluid and gas. The accumulator is in selective fluid communication with the reversible pump/motor to deliver pressurized working fluid to the reversible pump/motor when operating as a motor, and to receive pressurized working fluid discharged by the reversible pump/motor when operating as a pump.

The present invention provides, in another aspect, a method of operating an energy storage system. The method includes providing a reservoir defining an interior chamber, positioning a collapsible bladder within the interior chamber, returning working fluid to the collapsible bladder with a reversible pump/motor when operating as a motor, drawing working fluid from the collapsible bladder when the reversible pump/motor is operating as a pump, and permitting replacement air to enter the interior chamber of the reservoir when working fluid is drawn from the collapsible bladder.

The present invention provides, in yet another aspect, an energy storage system including a reservoir defining an interior chamber having working fluid therein. The system also includes a one-way valve in fluid communication with the interior chamber and operable to permit entry of replacement air into the interior chamber as working fluid exits the reservoir, a pressure relief valve in fluid communication with the interior chamber and selectively operable to vent air in the interior chamber outside the reservoir, an air pump in selective fluid communication with the interior chamber and operable to discharge pressurized air into the interior chamber, a reversible pump/motor in fluid communication with the reservoir, and an accumulator containing working fluid and gas. The accumulator is in selective fluid communication with the reversible pump/motor to deliver pressurized working fluid to the reversible pump/motor when operating as a motor, and to receive pressurized working fluid discharged by the reversible pump/motor when operating as a pump.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
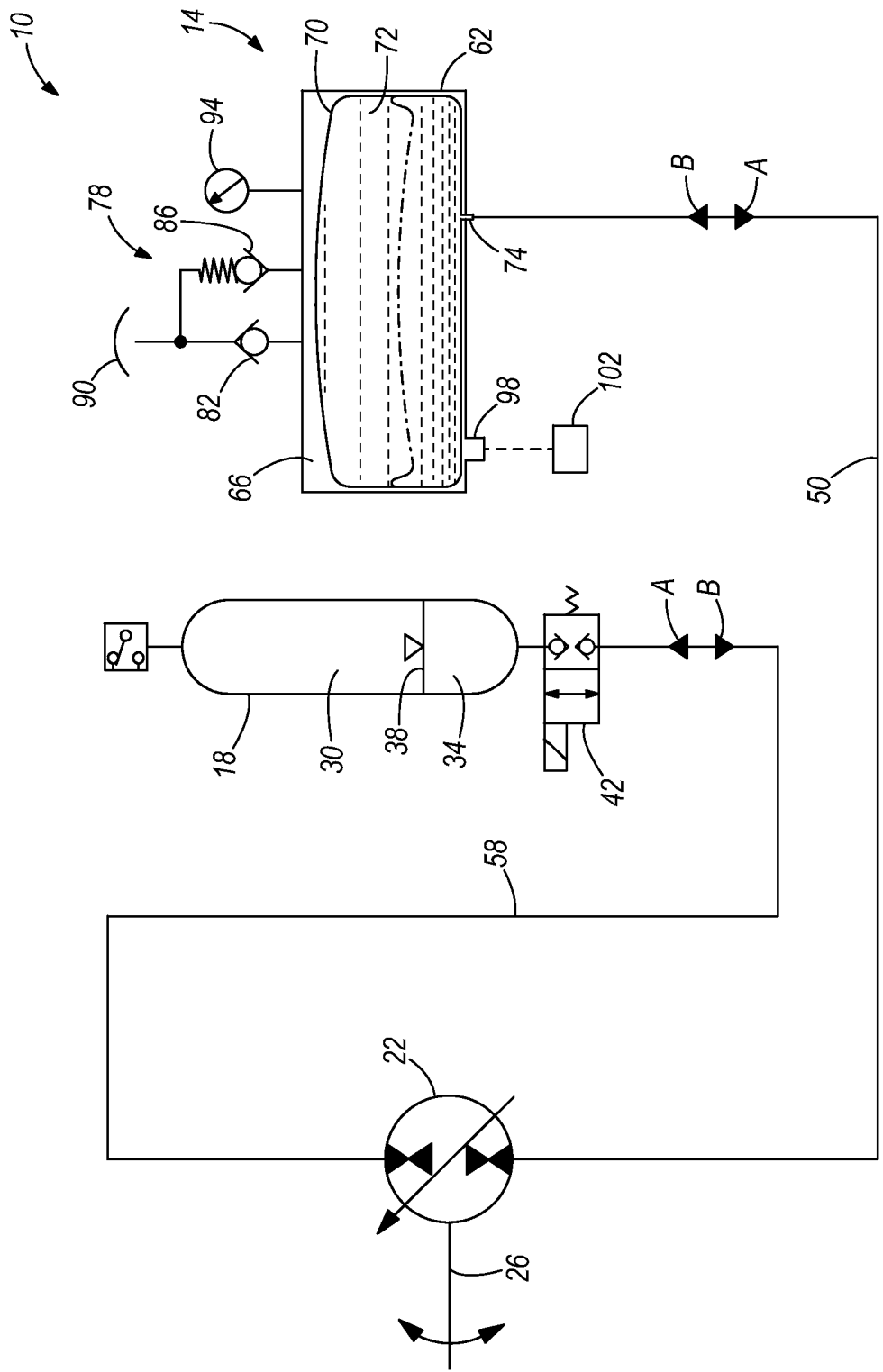
FIG. 1 is a schematic view illustrating an energy storage system according to a first construction of the invention.

FIG. 1 illustrates a first construction of an energy storage system 10. Specifically, the system 10 is for use with a hybrid vehicle and is configured as a parallel hydraulic regenerative drive system 10 including a reservoir 14, an accumulator 18, and a reversible pump/motor 22 in selective fluid communication with the accumulator 18 and in fluid communication with the reservoir 14. The reversible pump/motor 22 is configured as a variable displacement, axial-piston, swashplate-design pump/motor 22, such as a Bosch Rexroth Model No. A4VSO variable displacement, axial piston reversible pump/motor 22. Alternatively, the reversible pump/motor 22 may be configured having a constant displacement rather than a variable displacement. The reversible pump/motor 22 is drivably coupled to a rotating shaft 26 (e.g., an output shaft of an engine, an accessory drive system of the engine, a drive shaft between a transmission and an axle assembly, etc.). As is described in more detail below, the pump/motor 22 transfers power to the rotating shaft 26 when operating as a motor, and the pump/motor 22 is driven by the rotating shaft 26 when operating as a pump. Alternatively, the system 10 may be utilized in other applications (e.g., a mobile or an industrial hydraulic application, etc.).

The accumulator 18 includes a first chamber 30 containing a gas (e.g. nitrogen, etc.), a second chamber 34 containing a working fluid (e.g. hydraulic fluid, etc.), and a movable piston 38 separating the chambers 30, 34 (schematically illustrated as a line between the chamber 30 and the chamber 34). Alternatively, the accumulator 18 may be configured with a bladder or a diaphragm rather than the piston 38. The system 10 also includes an isolation valve 42 in fluid communication with the working fluid chamber 34 in the accumulator 18. The isolation valve 42 selectively fluidly communicates the accumulator 18 and the pump/motor 22. The isolation valve 42 may be configured as a poppet valve, ball valve, spool valve, gate valve, cartridge valve, needle valve, block valve, etc. Further, the isolation valve 42 is solenoid-actuated to open and spring-biased to close.

With continued reference to FIG. 1, the reservoir 14 contains working fluid and is in fluid communication with the reversible pump/motor 22 by a fluid passageway 50. A heat exchanger and/or a working fluid filter (not shown) may be situated in the fluid passageway 50 to facilitate cooling and filtering of the working fluid. The reversible pump/motor 22 is in fluid communication with the reservoir 14 to draw low-pressure working fluid (in the direction of arrow A) from the reservoir 14 via the fluid passageway 50 when operating as a pump. The reversible pump/motor 22 is also in fluid communication with the reservoir 14 to return low-pressure working fluid (in the direction of arrow B) to the reservoir 14 via the fluid passageway 50 when operating as a motor.

The reversible pump/motor 22 is in fluid communication with the accumulator 18 via a fluid passageway 58 to deliver pressurized working fluid (in the direction of arrow A) to the accumulator 18 when operating as a pump. The reversible pump/motor 22 is also in fluid communication with the accumulator 18 via the fluid passageway 58 to receive pressurized working fluid (in the direction of arrow B) from the accumulator 18 when operating as a motor. The isolation valve 42 is situated in the fluid passageway 58 and blocks the flow of working fluid through the passageway 58 when in a closed configuration, and permits the flow of working fluid through the passageway 58 when in an open configuration.

With continued reference to FIG. 1, the reservoir 14 includes a housing 62 defining an interior chamber 66, and a collapsible, non-elastic bladder 70 positioned within the interior chamber 66 of the housing 62. As is discussed in more detail below, the housing 62 is substantially air-tight and is capable of maintaining pressurized air within the housing 62. In the illustrated construction of the system 10, the housing 62 is schematically illustrated as having a generally rectangular shape. However, the housing 62 may be configured having any of a number of different shapes to conform with the structure of a hybrid vehicle within which the housing 62 is located. In addition, the housing 62 may be made from any of the number of different materials (e.g., metals, plastics, composite materials, etc.).

The collapsible, non-elastic bladder 70 defines an interior chamber 72 within which working fluid is contained. Because the bladder 70 is non-elastic, the maximum volume of the interior chamber 72 is a fixed value, in contrast with an elastic bladder defining a variable-volume interior chamber. The bladder 70 is also non-rigid, and therefore generally conforms to the particular shape of the interior chamber 66 of the housing 62. In the illustrated construction of the system 10, the bladder 70 is schematically illustrated as assuming a generally rectangular shape as a result of being positioned within the housing 62, which includes a generally rectangular interior chamber 66. Alternatively, the bladder 70 may assume any of a number of different shapes depending upon the particular shape of the housing 62.

The bladder 70 includes a single inlet/outlet port 74 in fluid communication with the fluid passageway 50 through which working fluid passes to enter or exit the bladder 70. Alternatively, the bladder 70 may include separate inlet and outlet ports through which working fluid enters the bladder 70 and exits the bladder 70, respectively. Although not shown, the bladder 70 may include an air release valve to facilitate removal of air from the chamber 72 when the bladder 70 is filled with working fluid. As shown in FIG. 1, all of the working fluid contained within the reservoir 14 during normal operation of the system 10 is located within the bladder 70. The bladder 70 functions as a shield or barrier between the working fluid and the atmosphere (i.e., including the air or other gas within the interior chamber 66 of the housing 62) to reduce the risk of any potential contamination of the working fluid from debris in the atmosphere or the interior chamber 66 of the housing 62. Alternatively, the bladder 70 may be omitted from the system 10, such that the working fluid is contained directly in the pressurized housing 62.

The system 10 also includes a breather assembly 78 in fluid communication with the interior chamber 66 of the housing 62 that allows the reservoir 14 to self-pressurize during operation of the system 10 and the hybrid vehicle incorporating the system 10. As is described in more detail below, pressurization of the reservoir 14 (i.e., pressurization of the interior chamber 66 of the housing 62) substantially ensures that the pressure of the working fluid at the inlet of the pump/motor 22 is maintained at a level sufficient to substantially prevent cavitation of the pump/motor 22 when operating as a pump. The breather assembly 78 includes a springless, one-way check valve 82 in fluid communication with the interior chamber 66 of the housing 62 that permits replacement air at atmospheric pressure to enter the interior chamber 66 as the fluid level in the bladder 70 decreases, but prevents discharge or escape of air from the interior chamber 66. Alternatively, the check valve 82 may include a spring to bias the check valve 82 to a closed configuration.

The breather assembly 78 also includes a spring-biased, one-way pressure relief check valve 86 in fluid communication with the interior chamber 66 of the housing 62 connected in parallel with the one-way check valve 82 to permit discharge of air from the interior chamber 66 should the pressure in the interior chamber 66 exceed some predetermined value. Both valves 82, 86 are fluidly connected to a common breather 90, which directs replacement air from the atmosphere to the valve 82, and directs discharged air from the valve 86 to the atmosphere.

With continued reference to FIG. 1, the system 10 includes a pressure sensor 94 in fluid communication with the interior chamber 66 of the housing 62 to detect the pressure in the interior chamber 66. The pressure sensor 94 may be employed with a diagnostic function to determine the existence of any leaks in the pressurized housing 62. For example, should the pressure within the interior chamber 66 fall below some predetermined value during operation of the system 10, the pressure sensor 94 may provide a signal to an engine control unit ("ECU") or a separate control unit of the hybrid vehicle within which the system 10 is incorporated to cease operation of the regenerative drive system 10 of the hybrid vehicle. The ECU or separate control unit of the hybrid vehicle may also trigger an alarm (e.g., a visual alarm, an audible alarm, etc.) upon the pressure in the interior chamber 66 falling below the predetermined value to warn the operator of the hybrid vehicle that maintenance is required on the system 10.

With continued reference to FIG. 1, the housing 62 includes a sump 98 within which any leaked working fluid from the bladder 70 may accumulate. The system 10 may also include a leakage sensor 102 operable to detect any accumulated working fluid in the sump 98. Like the pressure sensor 94, the leakage sensor 102 may be employed with a diagnostic function to determine the existence of any leaks in the bladder 70. For example, upon detection of working fluid in the sump 98, the leakage sensor 102 may provide a signal to the ECU or a separate control unit of the hybrid vehicle within which the system 10 is incorporated to cease operation of the regenerative drive system 10 of the hybrid vehicle. The ECU or separate control unit of the hybrid vehicle may also trigger an alarm (e.g., a visual alarm, an audible alarm, etc.) upon detection of working fluid within the sump 98 by the leakage sensor 102 to warn the operator of the hybrid vehicle that maintenance is required on the system 10.

In operation, when the system 10 recovers kinetic energy from the rotating shaft 26, the pump/motor 22 operates as a pump to draw working fluid from the bladder 70 in the direction of arrow A, pressurize the working fluid, and pump the pressurized working fluid into the working fluid chamber 34 of the accumulator 18 through the open isolation valve 42. As working fluid exits the bladder 70, the bladder 70 collapses upon itself (shown in phantom in FIG. 1), and replacement air is allowed into the interior chamber 66 through the one-way check valve 82. After the kinetic energy of the rotating shaft 26 is recovered, the isolation valve 42 is actuated to a closed configuration, and the compressed gas in the gas chamber 30 of the accumulator 18 acts on the piston 38 to maintain the working fluid at a high pressure within the accumulator 18.

When the hybrid vehicle requires propulsion assistance, the isolation valve 42 is actuated to an open configuration to permit the flow of pressurized working fluid in the direction of arrow B from the accumulator 18. High-pressure working fluid flows from the accumulator 18, through the fluid passageway 58, and into the pump/motor 22 to operate the pump/motor 22 as a motor to drive the shaft 26. The pump/motor 22 then returns the low-pressure working fluid to the bladder 70 via the fluid passageway 50. As the fluid level in the bladder 70 increases, the one-way check valve 82 and the pressure relief check valve 86 remain closed and prevent air from escaping the interior chamber 66 of the housing 62. As a result, the pressure of the air in the interior chamber 66 increases. Subsequent cycles of drawing replacement air into the interior chamber 66 when the pump/motor 22 operates as a pump to draw working fluid from the bladder 70, and pressurizing the air in the interior chamber 66 when the pump/motor 22 operates as a motor to return working fluid to the bladder 70, continue during operation of the hybrid vehicle. During each cycle, the pressure in the interior chamber 66 is incrementally increased until a positive pressure (i.e., a pressure greater than atmospheric pressure) is exerted on the bladder 70 and the working fluid contained within the bladder 70. The pressure in the interior chamber 66 is allowed to build or increase to a predetermined value by which the minimum required working fluid inlet pressure of the pump/motor 22 is satisfied to reduce or substantially prevent cavitation of the pump/motor 22 when operating as a pump. The pressure relief check valve 86 would open to relieve the pressure in the interior chamber 66 only when the pressure exceeds this predetermined value beyond a predetermined safety factor.

Figure 2:
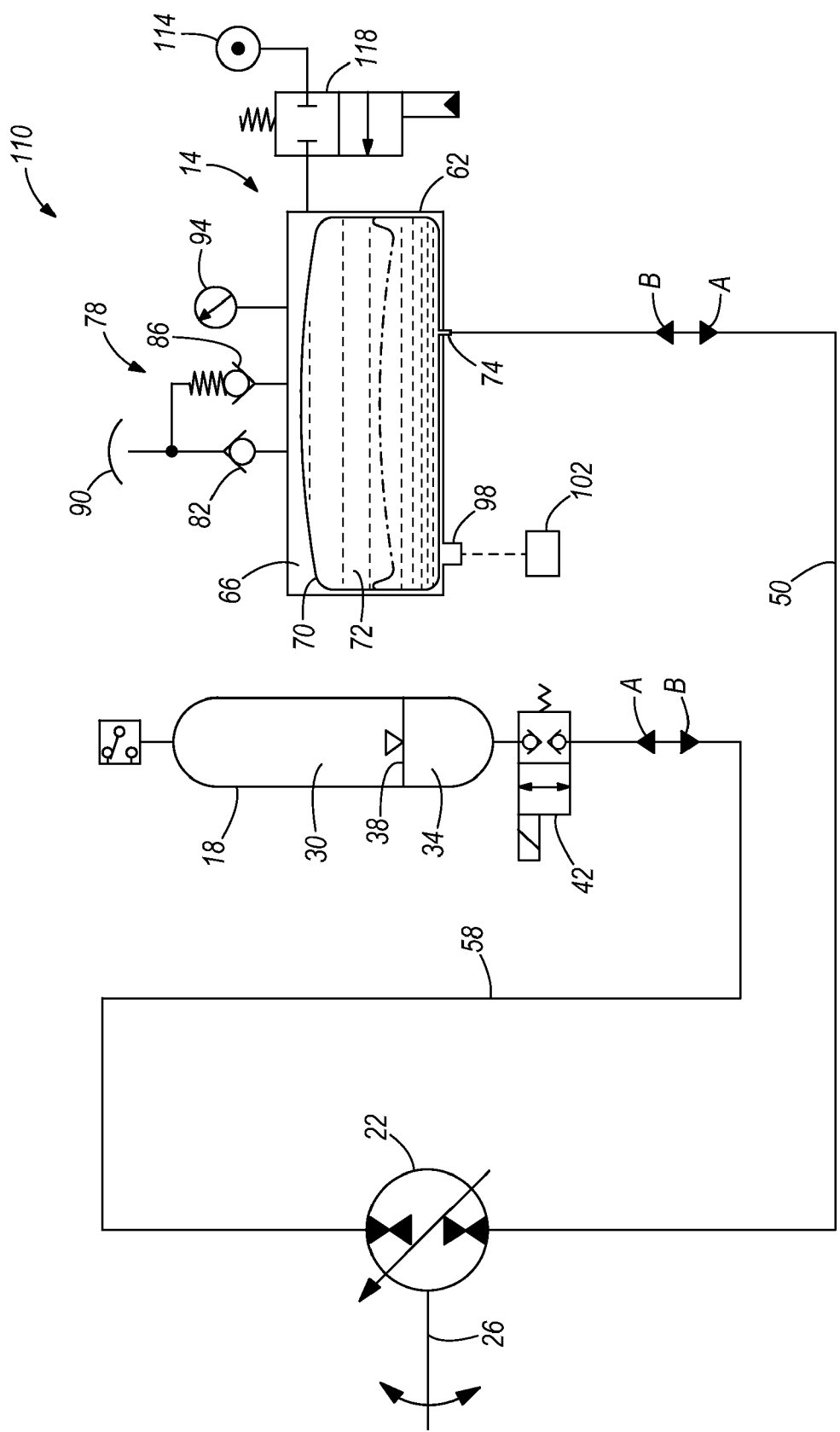
FIG. 2 is a schematic view illustrating an energy storage system according to a second construction of the invention.

FIG. 2 illustrates a second construction of an energy storage system 110 for a hybrid vehicle, with like components labeled with like reference numerals. The system 110 of FIG. 2 is substantially similar to the system 10 of FIG. 1, with the exception that the system 110 of FIG. 2 includes a source of compressed air or gas (e.g., an on-board pump or compressor 114) to provide an initial or "pre-charge" of air in the interior chamber 66, prior to operation of the hybrid vehicle, to pressurize the interior chamber 66 and exert a compressive force on the bladder 70 to meet the minimum required working fluid inlet pressure of the pump/motor 22. The system 110 also includes a solenoid-actuated isolation valve 118 fluidly connected between the reservoir 14 and the compressor 114. Alternatively, should the compressor 114 be dedicated to the system 10, the isolation valve 118 may be replaced with a check valve.

In the illustrated construction of the system 110, the compressor 114 and valve 118 are in fluid communication with the interior chamber 66 in a parallel relationship with the valve 82. In other words, the pressurized air provided by the compressor 114, and the atmospheric replacement air passing through the valve 82, enter the interior chamber 66 through separate passageways. Alternatively, the outlet of the isolation valve 118 may be fluidly connected to the passageway in which the valve 82 is situated at a location upstream of the valve 82, such that the pre-charge of pressurized air provided by the compressor 114 passes through the valve 82 before entering the interior chamber 66.

When the hybrid vehicle incorporating the system 110 is started, the isolation valve 118 is actuated to an open configuration, and the compressor 114 is activated to pump pressurized air into the interior chamber 66 to pressurize the interior chamber 66 to a predetermined value at which the force exerted on the bladder 70 (and the working fluid contained within the bladder 70) is sufficient to meet the minimum required working fluid inlet pressure of the pump/motor 22. When the pressure sensor 94 detects that the pressure in the interior chamber 66 has reached this predetermined value, the isolation valve 118 is actuated to a closed configuration and the compressor 114 is deactivated. As a result, the minimum required working fluid inlet pressure of the pump/motor 22 is satisfied without first requiring repeated cycles of drawing replacement air into the interior chamber 66 when the pump/motor 22 operates as a pump to draw working fluid from the bladder 70, and pressurizing the air in the interior chamber 66 when the pump/motor 22 operates as a motor to return working fluid to the bladder 70. However, after the first cycle of drawing replacement air into the interior chamber 66 when the pump/motor 22 operates as a pump to draw working fluid from the bladder 70, and pressurizing the air in the interior chamber 66 when the pump/motor 22 operates as a motor to return working fluid to the bladder 70, the system 110 operates substantially similarly as the system 10 of FIG. 1.

Various features of the invention are set forth in the following claims.

What is claimed is:

1. An energy storage system comprising:
    a reservoir defining an interior chamber;
    a collapsible bladder positioned within the interior chamber, the bladder having working fluid therein;
    a one-way valve in fluid communication with the interior chamber and operable to permit entry of replacement air into the interior chamber as working fluid exits the bladder;
    a reversible pump/motor in fluid communication with the bladder; and
    an accumulator containing working fluid and gas, the accumulator in selective fluid communication with the reversible pump/motor to deliver pressurized working fluid to the reversible pump/motor when operating as a motor, and to receive pressurized working fluid discharged by the reversible pump/motor when operating as a pump.

2. The energy storage system of claim 1, further comprising a pressure relief valve in fluid communication with the interior chamber of the reservoir and operable to prevent ventilation of the replacement air from the interior chamber below a predetermined threshold pressure when working fluid enters the collapsible bladder.

3. The energy storage system of claim 1, further comprising an air pump in selective fluid communication with the interior chamber of the reservoir and operable to fill the interior chamber with pressurized air to exert a compressive force on the bladder.

4. The energy storage system of claim 1, further comprising a pressure sensor in fluid communication with the interior chamber of the reservoir to detect the air pressure in the interior chamber.

5. The energy storage system of claim 1, wherein the reservoir includes a sump positioned below the bladder.

6. The energy storage system of claim 5, further comprising a sensor operable to detect working fluid in the sump leaked from the bladder.

7. The energy storage system of claim 1, wherein working fluid is drawn from the bladder by the reversible pump/motor when operating as a pump.

8. The energy storage system of claim 1, wherein the bladder defines an interior chamber, and wherein the reversible pump/motor is in fluid communication with the interior chamber of the bladder.

9. The energy storage system of claim 1, wherein the bladder is non-elastic.

10. A method of operating an energy storage system, the method comprising:
   providing a reservoir defining an interior chamber;
   positioning a collapsible bladder within the interior chamber;
   returning working fluid to the collapsible bladder with a reversible pump/motor when operating as a motor;
   drawing working fluid from the collapsible bladder when the reversible pump/motor is operating as a pump; and
   permitting replacement air to enter the interior chamber of the reservoir when working fluid is drawn from the collapsible bladder.

11. The method of claim 10, further comprising preventing ventilation of the replacement air from the interior chamber below a predetermined threshold pressure in the interior chamber when working fluid is returned to the collapsible bladder.

12. The method of claim 10, further comprising filling the interior chamber with pressurized air before working fluid is drawn from the bladder.

13. The method of claim 12, wherein filling the interior chamber with pressurized air occurs before working fluid is returned to the collapsible bladder.

14. The method of claim 10, further comprising monitoring the air pressure in the interior chamber of the reservoir.

15. The method of claim 10, further comprising:
   providing a sump below the collapsible bladder; and
   monitoring the sump for working fluid leaked from the bladder and accumulating in the sump.

16. An energy storage system comprising:
   a reservoir defining an interior chamber having working fluid therein;
   a one-way valve in fluid communication with the interior chamber and operable to permit entry of replacement air into the interior chamber as working fluid exits the reservoir;
   a pressure relief valve in fluid communication with the interior chamber and selectively operable to vent air in the interior chamber outside the reservoir;
   an air pump in selective fluid communication with the interior chamber and operable to discharge pressurized air into the interior chamber;
   a reversible pump/motor in fluid communication with the reservoir; and
   an accumulator containing working fluid and gas, the accumulator in selective fluid communication with the reversible pump/motor to deliver pressurized working fluid to the reversible pump/motor when operating as a motor, and to receive pressurized working fluid discharged by the reversible pump/motor when operating as a pump.

17. The energy storage system of claim 16, further comprising a collapsible bladder positioned within the interior chamber, wherein the working fluid in the reservoir is contained entirely within the bladder.

18. The energy storage system of claim 17, wherein the air pump is operable to fill the interior chamber with pressurized air to exert a compressive force on the bladder.

19. The energy storage system of claim 17, wherein working fluid is drawn from the bladder by the reversible pump/motor when operating as a pump.

20. The energy storage system of claim 17, wherein the bladder is non-elastic.

\* \* \* \* \*